No. 630,102. Patented Aug. 1, 1899.
J. PEGG.
RAKE ATTACHMENT FOR HARVESTERS.
(Application filed June 6, 1898.)
(No Model.) 5 Sheets—Sheet 1.
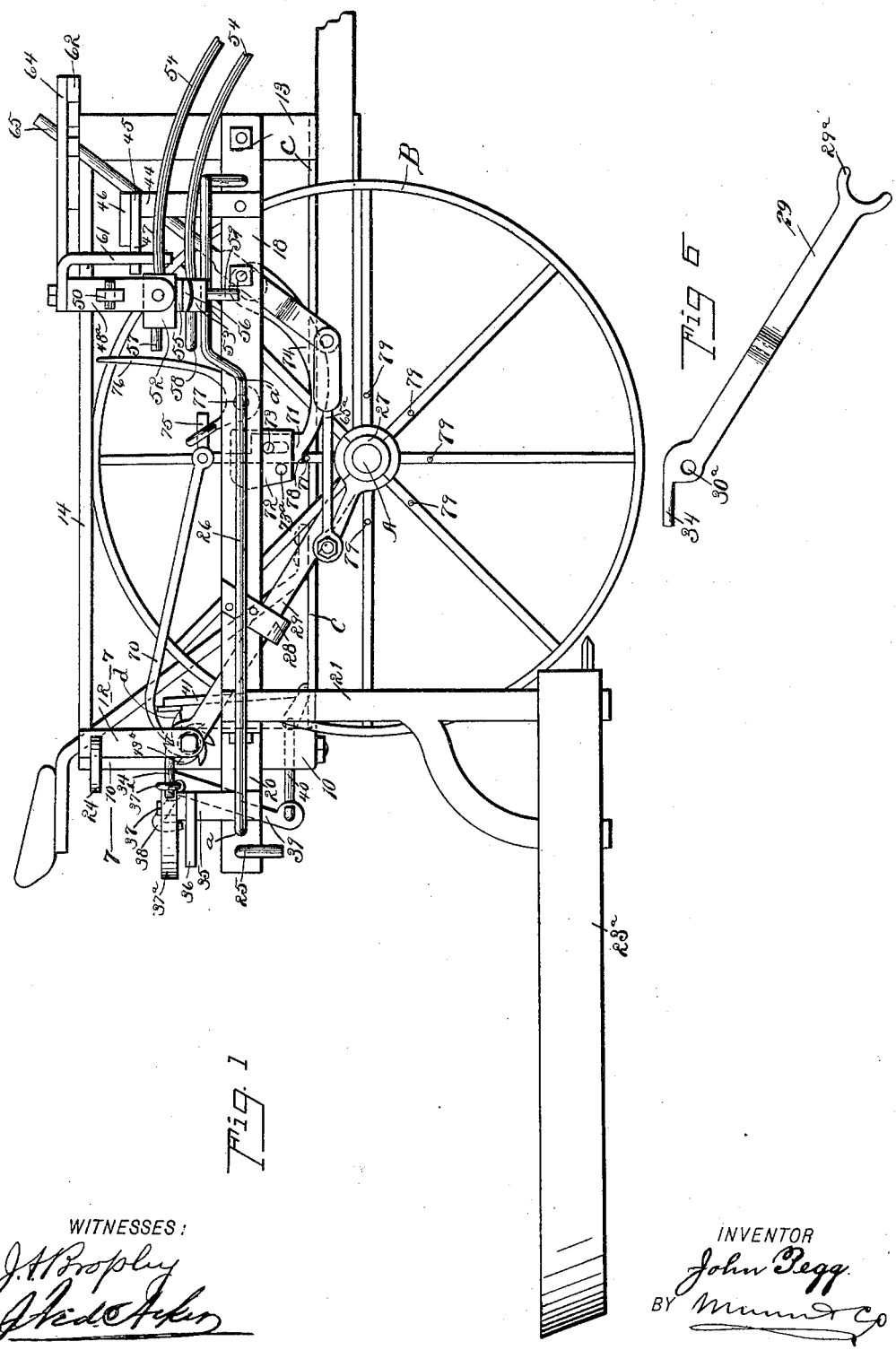
WITNESSES:
INVENTOR
John Pegg.
BY
ATTORNEYS.

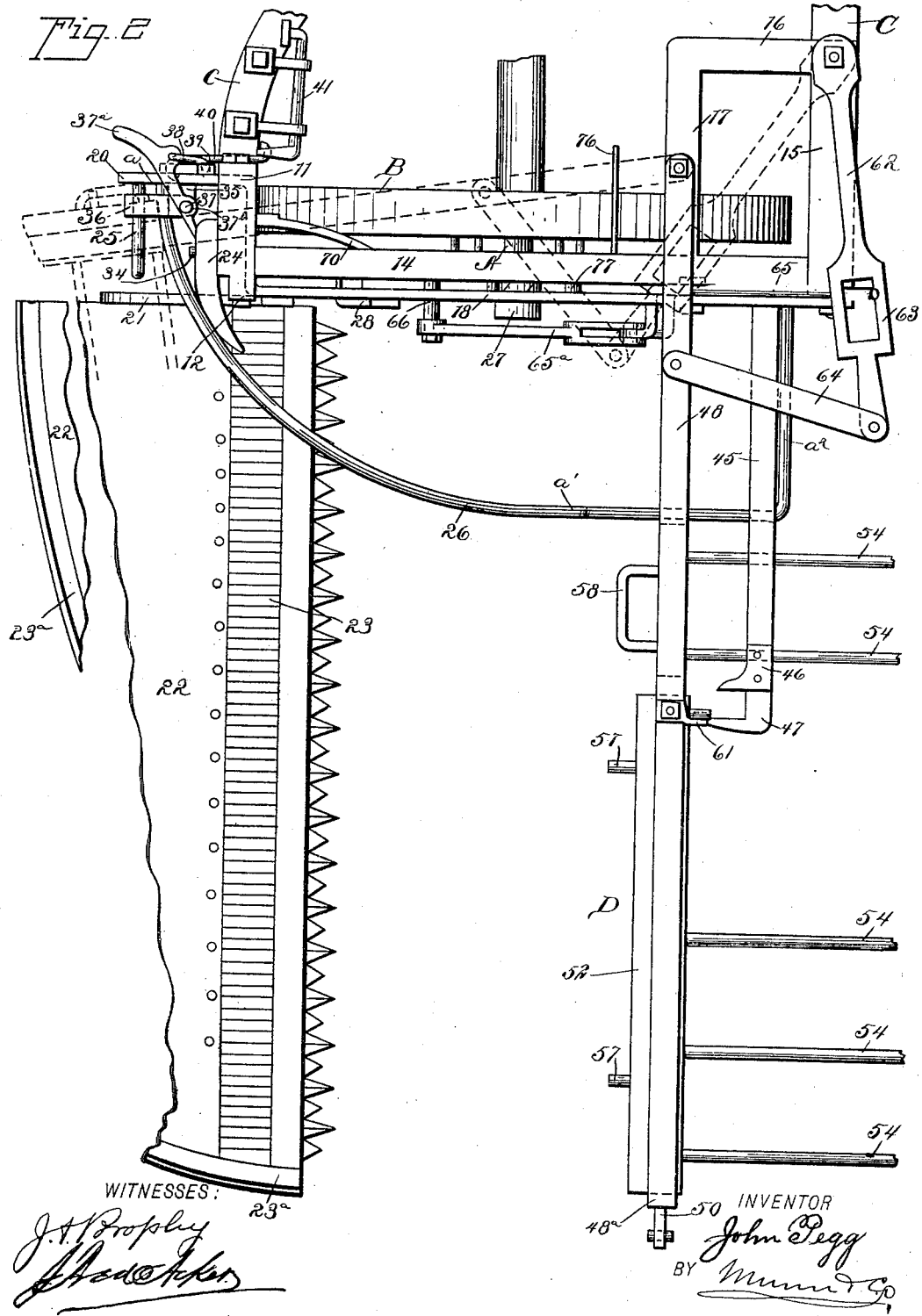

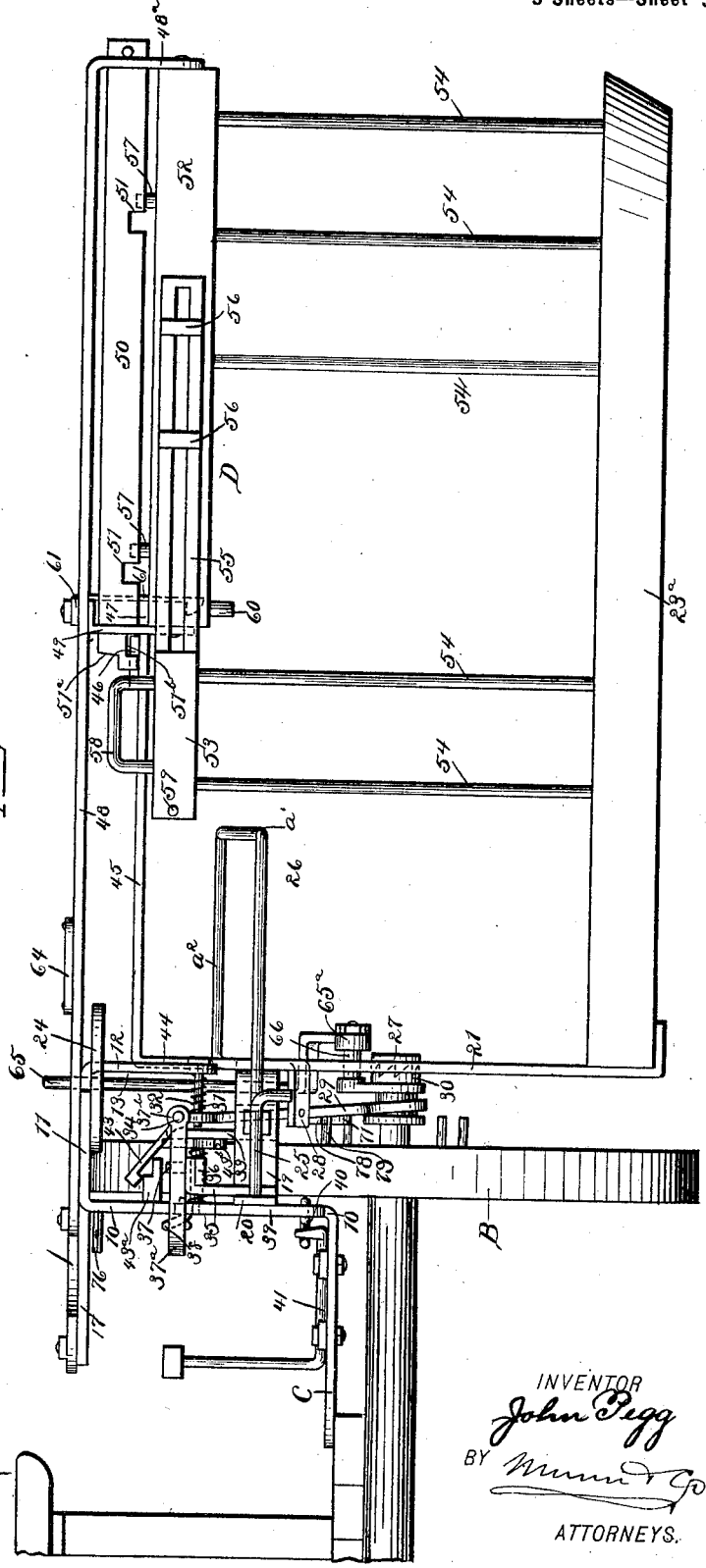

No. 630,102. Patented Aug. 1, 1899.
J. PEGG.
RAKE ATTACHMENT FOR HARVESTERS.
(Application filed June 6, 1898.)
(No Model.) 5 Sheets—Sheet 4.
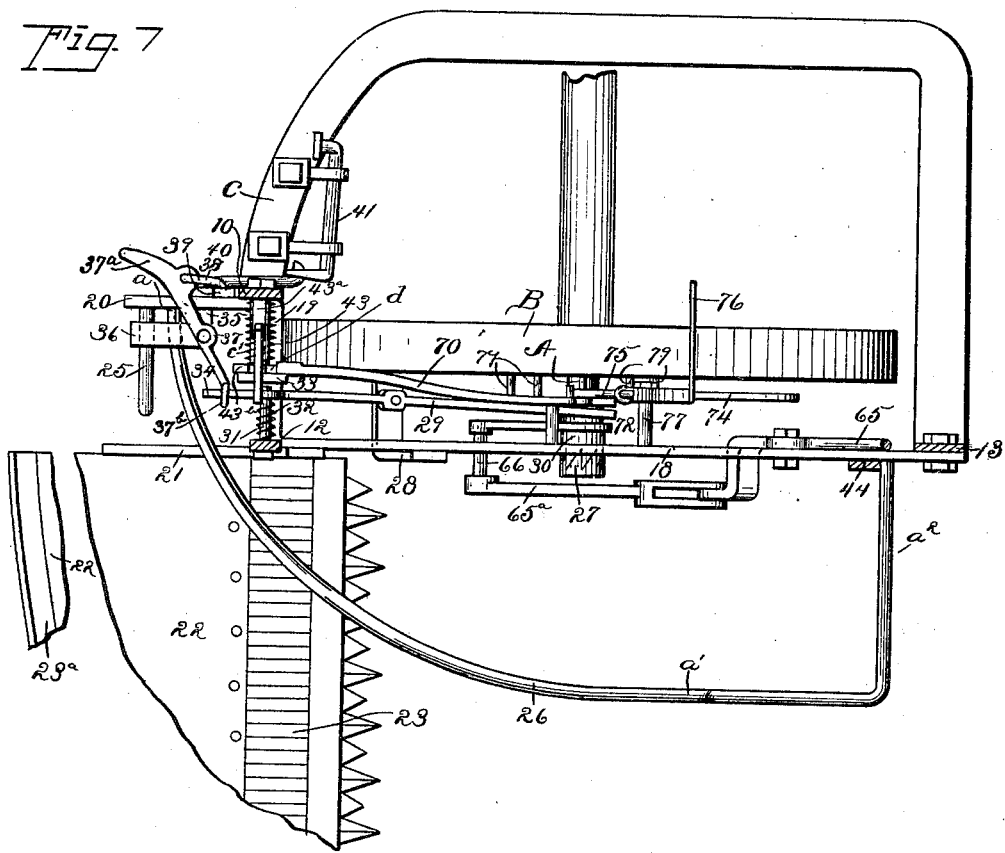
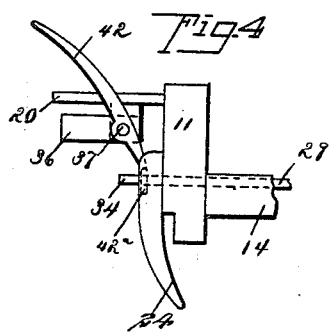
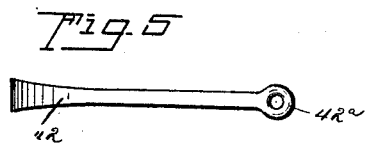
WITNESSES:
INVENTOR
John Pegg
BY Munn & Co
ATTORNEYS.

No. 630,102. Patented Aug. 1, 1899.
J. PEGG.
RAKE ATTACHMENT FOR HARVESTERS.
(Application filed June 6, 1898.)
(No Model.) 5 Sheets—Sheet 5.
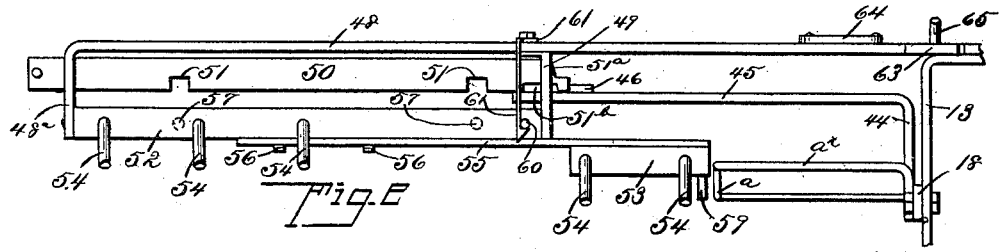
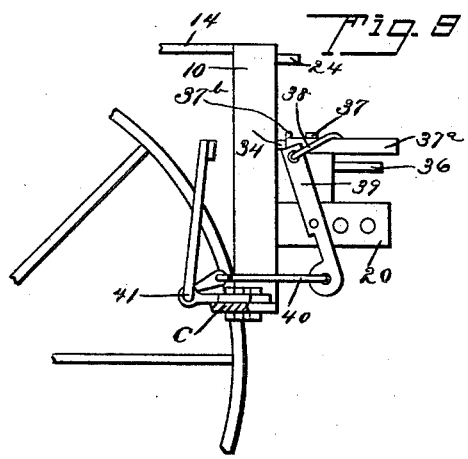
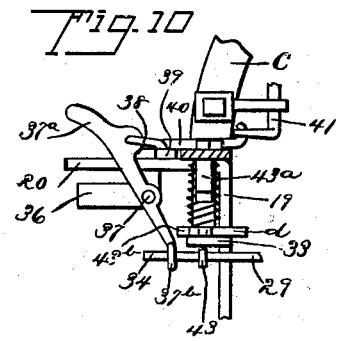
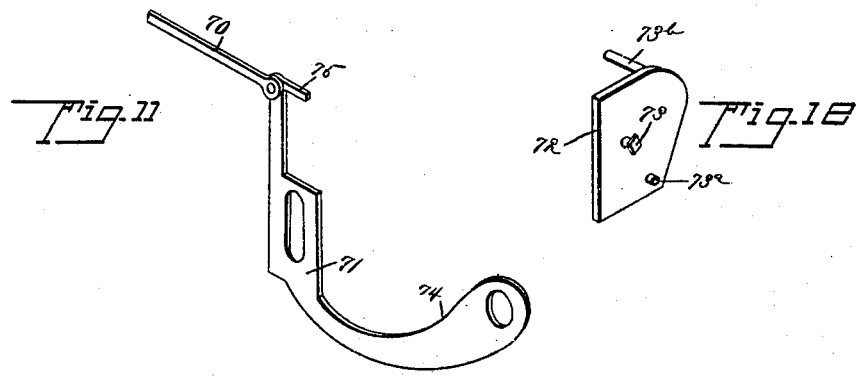
WITNESSES:
INVENTOR
John Pegg
BY
ATTORNEYS.

UNITED STATES PATENT OFFICE.

JOHN PEGG, OF BLOOMINGPORT, INDIANA.

RAKE ATTACHMENT FOR HARVESTERS.

SPECIFICATION forming part of Letters Patent No. 630,102, dated August 1, 1899.

Application filed June 6, 1898. Serial No. 682,704. (No model.)

*To all whom it may concern:*

Be it known that I, JOHN PEGG, of Bloomingport, in the county of Randolph and State of Indiana, have invented a new and Improved Rake Attachment for Harvesters, of which the following is a full, clear, and exact description.

The object of my invention is to provide a simple, durable, effective, and readily-applied rake attachment for harvesters and, furthermore, to provide a means whereby the operation of the rake will be automatic.

A further object of the invention is to so construct and attach the rake to the harvester that it will not add to the draft on the team when not in use, it being capable of attachment to one of the wheels of the harvester, when so attached extending forwardly and rearwardly or substantially parallel with the side beams of the harvester-frame.

Another object of the invention is to so construct the rake attachment that the rake will not wear to the usual extent, since the rake will be in operation only when it is actually required.

Another object of the invention is to so construct the rake attachment that the rake will effectually carry the straw or clover from the front to the rear of the platform and off the platform at the rear, the rake returning to its working position at the front horizontally, dropping only to the vertical position when it reaches the front of the platform.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a portion of a harvester, illustrating the application of the rake attachment thereto, the rake being in its forward position and nearly ready to drop to a raking position. Fig. 2 is a plan view of the portion of the harvester shown in Fig. 1, the rake attachment being in the same position as shown in Fig. 1. Fig. 3 is a rear elevation of a portion of the harvester and the harvester-platform, illustrating the rake in vertical or raking position. Fig. 4 is a plan view of a portion of the frame of the harvester, illustrating the application thereto of a hand-lever for throwing the rake attachment in and out of gear with the machine. Fig. 5 is a side elevation of the said hand-lever. Fig. 6 is a side elevation of the shifting lever for the attachment, and Fig. 7 is a horizontal section on the line 7 7 of Fig. 1. Fig. 8 is a detail rear elevation of the rake-head and its carrying-arm, parts of the head being in the position shown in Fig. 2—*i. e.*, before the rake has assumed the position shown in Fig. 3. Fig. 9 is a detail side elevation of the foot-lever and its connections, looking grainward. Fig. 10 is a plan view of a portion of the parts shown in Fig. 9, other of the parts being in section. Fig. 11 is a detail perspective view of one of the shifting levers, and Fig. 12 is a detail perspective view of the bracket upon which the lever shown in Fig. 11 is adapted to be mounted.

A represents the axle of a harvester, and B the wheels thereof, secured to the axle, and C represents a frame supported by the axle and usually provided for harvesters, the driver's seat being located adjacent to the said frame. The frame C is located at the right-hand side of the harvester, between the wheels, and upon the right-hand rear portion of the frame a bracket is located, comprising an upright 10, a horizontal section 11, which is at the rear of the right-hand wheel, and a downwardly-extending right-hand member 12. (Shown in Figs. 1 and 3.)

At the forward right-hand end portion of the frame C an upright 13 is provided, and the said upright 13 is connected with the member 11 of the rear standard by an upper bar 14, extending in direction of the front and the rear of the machine. A horizontal rectangular frame is constructed at the upper forward right-hand portion of the machine, being connected with the upper longitudinal bar 14, and the said frame comprises a forward transverse member 15, a rear transverse member 17, and a connecting member 16, as shown in Fig. 2. A second longitudinal bar 18 is attached to the forward upright 13. This bar 18 is farther to the right than the upper bar 14 and extends rearward beneath the horizontal member 11 of the rear bracket and the pendent member 12, being carried into the upright 10 of the said bracket, as shown at 19 in Figs. 3 and 7, and thence rearwardly, as shown at 20 in Figs. 1, 3, and 7.

A standard 21 is attached to the longitudinal bar 18 or to any adjacent support, and the said standard is carried downward to support a platform 22, which platform at the front is attached to the finger-bar 23, and the platform is provided with a marginal flange 23ª, extending from the right-hand end of the finger-bar to the rear left-hand end of the platform, as is best shown in Figs. 2 and 7, and this flange 23ª will save all of the heads of clover, for example, that may have become detached from the straw.

A finger 24 is secured to the upper member 11 of the rear bracket, as is best shown in Figs. 1, 3, and 4, and at the rear extremity of the member 20 of the lower longitudinal bar 18 a track 25 is pivotally located, comprising an upper or horizontal member and a shorter member at an angle thereto. A main track 26 is likewise provided at the right-hand side of the frame of the harvester, the said track extending horizontally beyond the right-hand wheel. As shown at $a$, this track is secured at its rear end to the rearwardly-extending section 20 of the lower longitudinal bar 18 and from the said section is curved in direction of the right-hand side of the machine and thence forwardly, and near the forward portion of the frame of the machine the main track 26 is carried upward and forward, as shown at $a'$ in Fig. 1, the forward portion of the said main track 26 being therefore at a greater elevation than the rear portion, and at the front of the frame the track is carried horizontally to a connection with the forward portion of the longitudinal bar 18, as shown at $a^2$ in Figs. 2 and 7.

A clutch 27 is secured upon the outer end of the axle of the right-hand wheel B, as shown in Figs. 1, 3, and 7, and a bracket 28 is attached to the lower longitudinal bar 18 between its center and rear end, and in this bracket a shifting lever 29 is fulcrumed, as best shown in Figs. 6 and 7, the said shifting lever being so mounted as to have lateral movement. The lower end of the shifting lever 29 is provided with a fork 29ª, which fork is made to engage with a clutch 30, adapted to slide upon the right-hand end of the axle and be carried to or from engagement with the clutch 27, secured to that portion of the axle, as illustrated in Figs. 3 and 7. The shifting lever is given an upward and rearward inclination, and near its upper rear end an opening 30ª is formed, the said opening being adapted to receive a shaft 31, which is secured in the main member 10 of the rear bracket and its outer pendent member 12, as shown in Figs. 3 and 7. A spring 32 is coiled around the shaft 31, bearing against the pendent member 12 of the rear bracket and against the shifting lever 29, causing the upper rear end of the shifting lever to normally have bearing against the stop 33 (shown in Fig. 3) and the clutch 30, controlled by the shifting lever, to be normally held in engagement with the clutch 27 on the axle of the machine.

At the upper rear extremity of the shifting lever 29 a pin-section 34 is formed, and at the rear of the pin portion of the shifting lever an angular bracket 35 is secured to the rear extension 20 of the side bar 18, the said bracket being provided with a rearwardly-extending upper member 36, parallel with the said member 20 of the bar 18, as shown particularly in Fig. 4. A pin 37 is projected upward from the bracket 35, and upon the said pin 37 a horizontal lever 37ª is pivoted, provided with an eye 37ᵇ, which receives the pin extension from the shifting lever 29, as shown in Figs. 1, 2, and 7. The lever 37ª is connected by a link 38 with the upwardly-extending member 39 of a foot-lever, the downwardly-extending member of the foot-lever being connected by a link 40 with the crank-arm of a crank foot-lever 41, fulcrumed upon the frame C. Under such a construction when the foot-lever 39 is forced forward the lever 37ª, connected with the foot-lever, will so influence the shifting lever 29ª as to carry the clutch 30 out of engagement with the clutch 27 on the axle of the machine. It will be understood that the pin-section 34 is of such length that during the operation of the lever 29 the lever 37ª will continue in engagement with the said pin-section. The foot-lever, however, may be dispensed with or disconnected, if desired, and a hand-lever only be employed, as shown in Fig. 4, in which the hand-lever 42 is shown as fulcrumed upon the pin 37 and as provided with an eye 42ª, receiving the pin extension 34 from the shifting lever, and the action of the hand-lever with reference to the pin extension 37 is the same as has been described with reference to the foot-lever. The hand-lever may be provided with a latch, and any suitable form of locking device may be provided for the foot-lever.

When either the shifting lever 37ª or the lever 42 is moved in a direction to carry the clutch 30 out of engagement with the axle-clutch 27, the clutches are held out of engagement by a latch 43, loosely mounted upon the pin extension 34 of the shifting lever employed, as shown in Figs. 3 and 7, the said latch at that time being brought in contact at its free end with the keeper 43ª, secured to the upright 10 of the frame C, as shown also in Figs. 3 and 7. A ratchet-wheel 43ᵇ is placed immediately below the latch 43, being usually held in position upon the shaft on which it is loosely mounted by a spring $c'$, as shown in Fig. 7. This wheel is provided with teeth equal in number to the number of spokes upon the right-hand supporting-wheel B; but one tooth is longer than the others, said tooth being designated as $d$, being best illustrated in Figs. 1 and 7.

A dog 70 is employed for operating the ratchet-wheel 43$^b$, as illustrated in Fig. 1. This dog is attached to an upright lever 71, which is fulcrumed, by means of a pin 73, upon a bracket 72, projected downward from the bar 18, as shown in Figs. 1 and 7. The lever 71 is provided with an elongated opening at its pivot-point, so that the said lever may be raised vertically, if desired, and the lower end of the lever 71 is provided with a weighted arm 74.

The lever 71 and bracket 72 are shown in detail in Figs. 11 and 12, the bracket being illustrated with a pin 73$^a$, adapted to limit the movement of the lever 71 in one direction, as indicated in Fig. 1, the bracket being also shown as provided with a pin 73$^b$, adapted to enter the frame of the machine.

At the upper end of the lever 71, adjacent to the dog 70, a horizontal pin-section 75 is formed, which pin-section receives an eye formed upon the foot-lever 76, the said lever being fulcrumed upon a pin 77, attached to the bar or rail 18, as shown in Fig. 1. This foot-lever is illustrated in the drawings as being carried inwardly over the supporting-wheel; but it may be otherwise placed or shaped, if desired.

Where the weighted arm 74 connects with the lever 71, a shoulder 78 is formed, and this shoulder is adapted to be engaged by pins 79, which are secured to the spokes of the supporting-wheel and are brought in contact, one after the other, with the shoulder 78 as the wheel revolves, and each time that a pin strikes the shoulder 78 the lever 71 will be rocked in a direction to force the dog 70 against a tooth of the ratchet-wheel 43$^b$ and will turn the said wheel the distance of one tooth. When the hand-lever 42, for example, is carried to a position that will cause the two clutches to disengage, as heretofore stated, the latch 43 will engage with its keeper 43$^a$ and hold the clutches out of engagement; but when the machine has been started, the hand-lever 42 being free, after the supporting-wheel B has made one revolution it will have turned the ratchet-wheel to such an extent as to bring its long tooth under the latch and force the latch 43 out of engagement with its keeper, as illustrated in Fig. 3, whereupon the clutches will be forced into engagement by the spring 32 and the rake attachment will be set in operation, continuing in operation until the clutches are again disengaged. When it is desired to hold the clutches out of engagement while the machine is being drawn forward or carried backward, the foot-lever is operated upon, whereupon the said foot-lever will raise the lever carrying the dog and will take the said lever out of the path of the pins in the driving-wheel.

A standard 44 is attached to the forward end portion of the lower longitudinal right-hand bar 18, as shown in Fig. 1, and a trip-arm 45 is horizontally carried from the said standard 44 beyond the right-hand end of the machine and practically parallel with the sickle-bar. The trip-arm is provided with a rearwardly-extending beveled finger 46 near its extremity, and the said trip-arm further terminates in a second trip-finger 47, which is on a lower plane than the trip-finger 46, as shown in Fig. 2. A rake-arm 48 is pivoted upon the member 17 of the forward horizontal bracket of the frame, as shown in Fig. 2, and the said rake-arm is provided at its outer end with a downwardly-extending member 48$^a$ and at or near its center with a hanger 49, which extends downward from the said rake-arm, as shown principally in Fig. 3. A locking-bar 50 is held to slide in the member 48$^a$ of the rake-arm and in the hanger 49, the said locking-bar being provided at each side of its center with a recess 51 in its lower edge, and at the inner end of the locking-bar a recess 51$^a$ is formed in its upper edge and a second recess 51$^b$ is formed in its lower edge, as is also best shown in Fig. 3.

The rake-head D preferably consists of a main bar 52, pivotally supported in the members 48$^a$ and 49, and an extension-bar 53, held to slide upon the main bar, and suitable rake-teeth 54 are attached to the two sections of the head, being capable of extending downward almost to an engagement with the platform 22, as shown in Fig. 3. The extension section or bar 53 of the rake-head is provided with an attached slide 55, which receives guides 56, attached to the main portion or section 52 of the said rake-head, the section 53 being nearest the frame of the machine.

Pins 57 are secured upon the upper surface of the main section 52 of the rake-head, and the said pins are so placed that when the locking-bar 50 is carried to one position the pins will be opposite the openings 51 in the said locking-bar, permitting the rake-head to turn on its pivot-points, and whereby in a second position of the locking-bar the pins of the rake-head will engage with the forward portion of the locking-bar and the rake-head will be prevented from turning. The extension or sliding section 53 of the rake-head is preferably provided with an eye 58, located at its upper edge, as shown in Fig. 3. This section of the rake-head is also provided with a rearwardly-extending pin 59 at or near its inner end, the pin 59 facing the rear.

A pin 60 is located upon the under face of the main section 52 of the rake-head near its inner end, and the said pin 60 when the teeth of the rake-head are carried to a horizontal position, as shown in Figs. 1 and 2, is engaged by a spring-latch 61, attached to the rake-arm adjacent to the hanger 49, and when the latch engages with the said pin the rake-teeth will be held in horizontal position until released. A shifting arm 62 is pivoted upon the forwardly-extending member 16 of the forward horizontal bracket of the frame where the said member joins the forward transverse member 15, as illustrated in Fig. 2. The shifting arm between its ends is provided with a slotted section 63, and the right-hand end of the shifting arm is pivotally attached to a link 64, which in its turn is pivotally connected with the rake-arm 48, as is also shown in Fig. 2.

The upper end of an auxiliary shifting lever 65 is passed through the slotted section 63 of the shifting arm 62. The auxiliary shifting lever 65, as illustrated in Fig. 1, is fulcrumed upon the longitudinal bar 18 of the frame, and the lower end of the auxiliary shifting lever 65 is pivotally connected with a link 65$^a$, which link is pivotally connected with the horizontal member of a crank 66, the said crank being secured to the movable clutch 30, as illustrated in Figs. 2 and 3.

The operation of the device is as follows: Supposing the rake to be in the position shown in Fig. 3 and the two clutches 27 and 30 to be in engagement, as the machine is drawn forward the rake-head will move rearward and the inner rake-head will engage with the upwardly-projecting portion $a'$ of the track or guide-rail 26, and after the said upwardly-extending portion of the guide-rail is passed the innermost tooth of the rake will engage with the main section of the said rail. Therefore as the rake is carried rearward and removes the straw from the platform 22 the smaller sliding section of the rake-head will be gradually carried outward or upon the main section of the rake-head. At this time the pins 57 on the rake-head will be back of the locking-bar 50 and the rake-head cannot turn; but as soon as the finger 24 engages with the upper recessed surface 51$^a$ of the locking-bar 50 the locking-bar will be shifted outward in a manner to bring the recesses 51 opposite the pins 57 at the upper portion of the rake-head. The entire rake-head will now be free to turn upon its pivots. As soon as the smaller or sliding section 53 of the rake-head reaches the track 25 it will ride up thereon, and in ascending the curved outer end of the said track the sliding section of the rake-head will be turned front face downward and will so remain upon the track, causing the main section of the head to turn at the same time in the same direction and, furthermore, causing the teeth to assume a horizontal position. When the rake-teeth are horizontally placed, the latch 61 on the supporting-arm of the rake-head will engage with the pin 60 upon the main section of the head, retaining the said rake-head and its teeth in their horizontal position until the latch is disengaged from the pin. As the machine advances farther the rake-arm will be carried forward and the pin 59 on the sliding section of the rake-head will be upon the inner side of the guide-track 26. Thus as the rake-arm moves forward the sliding section 51 of the head will be drawn away from the main section 52, and when the sliding section rides up over the elevated portion $a'$ of the guide-rail 26 the entire rake-head D will be carried to such position that the finger 47 at the extreme outer end of the trip-arm will engage with the latch 61 and release it from the pin 60, thus permitting the rake-head to turn upon its pivots and the teeth to drop to a vertical or working position, as shown in Fig. 3. As soon as the teeth have assumed their vertical position the finger 46 on the trip-arm will have engaged with the under recessed portion 51$^b$ of the locking-bar 50 and will have drawn the said bar inward, carrying the recesses 51 in the locking-bar past the pins 57 on the top of the rake-head, causing the said pins to engage with a plain forward surface of the locking-bar and hold the teeth firmly in their raking or vertical position, and in this position, as has been above described, the rake-teeth will be carried over the platform to remove therefrom the accumulated straw.

This attachment is particularly adapted for use with clover-harvesters; but it may be used to advantage upon any form of harvester.

When it is desired to go to the field or to leave it, for example, after the rake-head has been carried to its rearward position and is over the pivoted shifting track 25 the said track may be turned upward to bring its outer end through the eye 58, secured to the sliding section of the rake-head, and in this manner the rake-head, with its teeth in horizontal position, will be locked to the frame of the harvester and the weight of the rake-head and rake-arm will be virtually taken off the team, the clutches 27 and 30 having been previously disconnected.

Having thus described my invention, I claim as new and desire to secure by Letters Patent—

1. The combination, with a frame of a harvester and its platform, of a rake-arm pivoted to said frame and operated by a supporting-wheel of said harvester, the said rake-arm being arranged to extend over the platform, a rake-head pivotally attached to said rake-arm, a locking-bar capable of sliding movement over the rake-head, and means, substantially as described, for operating the locking-bar and securing the rake-head in a horizontal position, substantially as described.

2. The combination, with the frame of a harvester and a rake-arm pivoted to the said frame and operated by a supporting-wheel of the said harvester, of a rake-head pivotally attached to the said rake-arm, pins projected from the rake-head, a locking-bar having sliding movement over the rake-head and provided with apertures capable of registry with the pins of the rake-head, a latch arranged to hold the rake-teeth of the rake-head in a horizontal position, shifting devices for the locking-bar, arranged to engage therewith at the forward and rear portion of the frame, and a releasing device for the latch located at the forward portion of said frame, as and for the purpose specified.

3. The combination, with a harvester-frame, a rake-arm pivoted thereto, a rake pivotally carried by the arm, and devices, substantially as described, for automatically moving the arm forward and rearward while the machine is in motion, of locking devices for the rake, a shifting mechanism for the locking devices, capable of being operated from a supporting-wheel or by hand, and a turning device for the rake, substantially as described.

4. The combination, with the frame of a harvester, a rake-arm pivotally attached to the said frame, and means, substantially as described, for imparting movement to the rake-arm through the revolution of a supporting-wheel of the harvester, of a rake-head constructed in sliding sections, the main section of the rake-head being pivotally supported by the rake-arm, a guide-rail for the sliding section of the rake-head, and a shifting rail at the rear portion of the machine, adapted for engagement likewise with the sliding section of the rake-head, a recessed locking-bar mounted to slide above the main portion of the rake-head, pins secured to the main section of the rake-head, adapted to pass through the recesses in the locking-bar or engage with the said bar, a shifting device located at the rear of the frame, arranged for engagement with the locking-bar, a latch carried by the rake-arm, adapted to hold the rake-teeth of the rake-head in a horizontal position, and a shifting arm located at the forward portion of the frame, provided with fingers one of which is arranged to shift the locking-bar and the other to release the said latch from engagement with the rake, as specified.

5. The combination, with a harvester-frame, a rake-arm carried thereby, a lever-controlled clutch connection between the rake-arm and the axle, a rake pivotally supported by the arm and provided with a sliding section, and a guide for the sliding section of the rake, of a locking-bar located over the said rake-head, a shifting finger arranged to engage with the locking-bar near the termination of the rearward movement of the arm, means for turning the rake-head at the end of its rearward movement, a latch for the rake-head adapted to engage therewith when turned, and a shifting and a releasing device arranged to engage respectively with the locking-bar and the latch when the said rake-arm is at the termination of its forward movement, the said releasing device permitting the teeth of the rake to drop, and the shifting device bringing the locking-bar in position to prevent the rake-head from turning while the rake-teeth are being carried rearward, as specified.

6. The combination, with the axle of a harvester, a clutch secured to the said axle, a second clutch loosely mounted on the axle, a shifting lever for the said clutch, and a locking device for the shifting lever, of a rake-arm mounted on the frame of the harvester, a lever connected with the movable clutch and having a driving connection with the rake-arm, and means, substantially as described, for releasing the locking device for the shifting lever by the movement of a supporting-wheel of the harvester, as and for the purpose specified.

7. The combination, with the axle of a harvester, a clutch secured to the said axle, a second clutch loosely mounted on the axle, a shifting lever for the said clutch, and a locking device for the shifting lever, of a rake-arm mounted on the frame of the harvester, a lever connected with the movable clutch and having a driving connection with the rake-arm, a ratchet-wheel mounted beneath the locking device for the shifting lever, one of the teeth of the ratchet-wheel being of sufficient length to engage with and disconnect the locking device from its keeper, a dog for the said ratchet-wheel operated by the movement of a supporting-wheel of the machine, and means, for carrying the said dog out of operative connection with the said supporting-wheel, for the purpose specified.

JOHN PEGG.

Witnesses:
ELIJAH V. NICHOLS,
W. E. WRIGHT.